July 31, 1962 J. F. SEBALD ET AL 3,047,276
CONTACT HEATER FOR LIQUIDS CONTAINING UNDISSOLVED SOLIDS
Filed Aug. 11, 1960 2 Sheets-Sheet 1
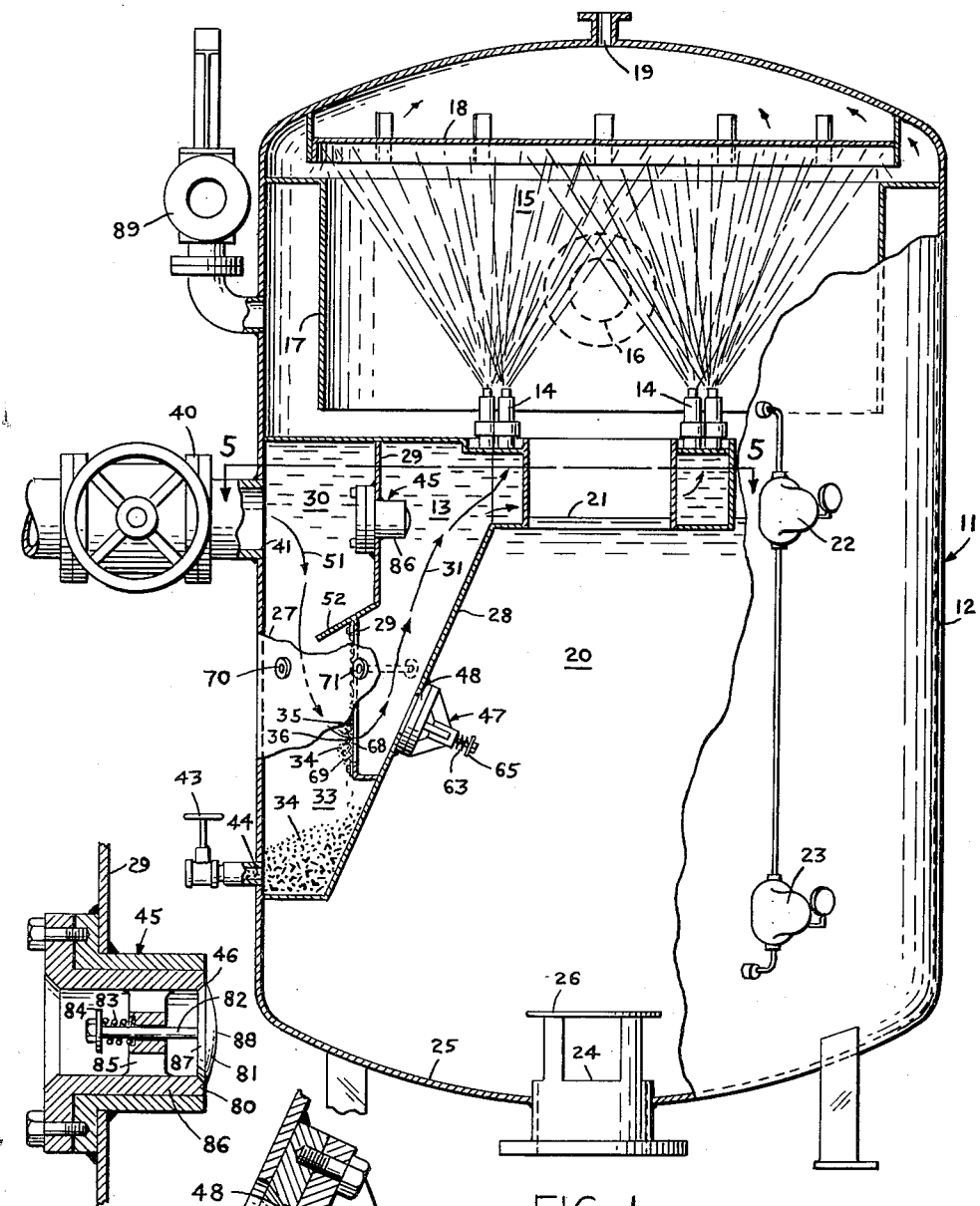
FIG. 1
FIG. 2
FIG. 3
JOSEPH F. SEBALD
ALONZO L. JONES
INVENTORS
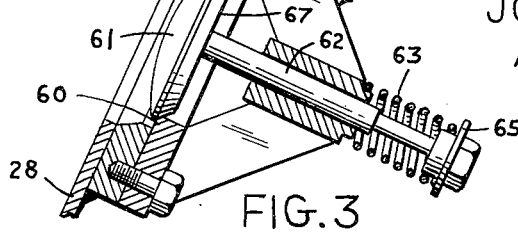

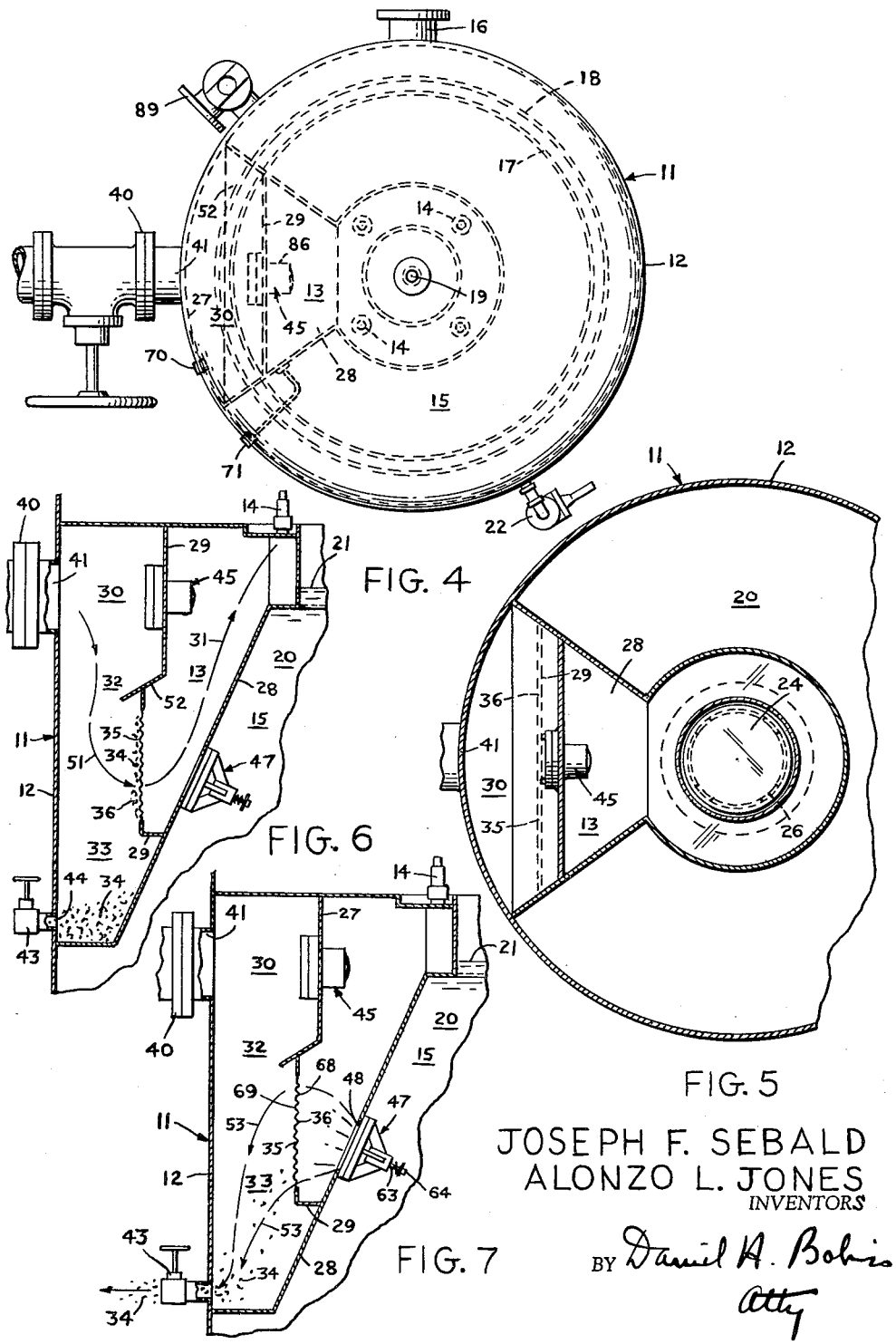

United States Patent Office 3,047,276
Patented July 31, 1962

3,047,276
CONTACT HEATER FOR LIQUIDS CONTAINING UNDISSOLVED SOLIDS
Joseph F. Sebald, Bloomfield, and Alonzo L. Jones, West Orange, N.J., assignors to Worthington Corporation, Harrison, N.J., a corporation of Delaware
Filed Aug. 11, 1960, Ser. No. 49,072
5 Claims. (Cl. 261—3)

This invention relates to direct contact water heaters. More particularly the invention contemplates the installation of means within the housing of a direct contact water heater for the removal of solid materials.

In a direct contact heater the water is sprayed by nozzles into a contact chamber for heat exchange by direct contact with steam. This type of heater has found considerable acceptance even in applications wherein process water takes into suspension large quantities of solid materials. One example of such an application is in heating recirculating process water used to vulcanize various rubber base products wherein large quantities of vulcanized rubber particles are carried in suspension by the process water. To prevent an excess of rubber particles from clogging the heater nozzles, a screen is usually provided upstream of the heater. The mesh of the screen is limited by the size of the openings in the heater spray nozzles. These screens have a blowdown means for removing the trapped solid materials and some arrangement for backwashing the screen. A bypass pipe may also be arranged to permit the shunting of the screen should it be desired to continue the process with unscreened process water when the screen is clogged.

While these filter means or screens in separate upstream housings provide means for preventing the clogging of nozzles or other water spreading means employed in direct contact water heaters, these upstream devices often create more problems than they solve. The separate screen housing with its associated piping represents a formidable expenditure of materials in relation to the job it accomplishes. Plant layout and safety problems also arise from the awkward shapes involved in the separate housing and associated paraphernalia.

The inventor contemplates an improvement in direct contact water heaters to obviate the difficulties outlined above. More particularly this invention is a direct contact water heater comprising a unitary housing, a contact chamber in the housing for mixing water with steam for heat exchange, means in the housing for defining a filter chamber for treating the water before it is delivered to said contact chamber, and filter means disposed in said filter chamber for the arresting of solid materials.

One object of the present invention is to eliminate the need for a separate screen housing and to minimize the piping in the process water circulating system by incorporating filter means and blowdown means inside of the direct contact heater.

Another object is to position the filter means where it will be subjected to only minor pressure differences so that it can be built economically as a light weight structure.

Another object is to employ downward directed circulation path and having angular acceleration to separate solid materials from the water.

Another object is to install the filter means adjacent the lower portion of the contact chamber so that heated water collected in the lower portion of the contact chamber can be used under gravity flow, without either pumping or piping, to serve as a backwash means for loosening and removing solid materials from the screen.

Another object is to arrange a backwash system wherein the backwash valve is automatically controlled by pressures which may be varied by manipulation of the external inflow and blowdown valves, so that the internal backwash valve control mechanism may be a simple spring valve and so that the need for operative communication with the backwash valve is eliminated.

Another object is to facilitate plant layout and to improve traffic by providing a more compact and geometrically regular unit.

Another object is to improve plant safety by eliminating external incidental piping valves and accessories which generally protrude and upon which workmen frequently trip, snare their clothing, bump heads and so forth.

Other objects and a fuller understanding of the invention will appear from the following description and claims viewed with reference to the accompanying drawings wherein:

FIGURE 1 is an elevation fragmented view of a direct contact water heater incorporating the present invention.

FIGURE 2 is an enlarged vertical sectional view of the bypass valve.

FIGURE 3 is an enlarged vertical sectional view of the backwash valve.

FIGURE 4 is a top plan view of the direct contact water heater and the spray nozzles.

FIGURE 5 is a section taken along line 5—5 of FIGURE 1.

FIGURE 6 is a diagrammatic sketch of the delivery chamber illustrating normal flow.

FIGURE 7 is a diagrammatic sketch of the delivery chamber illustrating backwash flow.

Referring more particularly to the drawings, the direct contact heater 11 includes the usual unitary shell-type housing 12. Process water enters the heater 11 through a filter chamber 13 and is introduced by water spreading means shown as nozzle 14 into contact chamber 15 for direct contact heat exchange with steam circulated in contact chamber 15. The steam enters contact chamber 15 through steam introducing means shown as steam introducing port 16 formed in housing 12 to communicate with contact chamber 15. The steam is guided by cylindrical baffle 17 and spray plate 18 and exits via gas vent 19 formed in housing 12. Gas vent 19 communicates with contact chamber 15 for the exhaust of steam and gases liberated during the heat exchange process.

The principle involved in spreading the water as it is introduced into contact chamber 15 by spraying, or otherwise, is to form as large a surface area of water as possible. The exchange of heat from the steam to the water takes place from the surface of the water droplet inward toward the middle of the droplet. The large water surface provided by atomizing the water into small droplets gives rise to a large contact area for exposure of the water to the steam.

The water is sprayed upward by nozzles 14 so that it will have a double exposure to the steam, once while the water droplets are ascending and once while the water droplets are descending.

The increase of heat accompanied by the increase in surface area also coact to expel gases from the water. The increase of heat stimulates molecular movement while the increase of surface area positions more gas molecules in the water droplets in proximity with a free surface of the water. The increased bombardment of the molecules of the entrapped gas against a larger water surface results in a greater number of gas molecules overcoming the cohesive forces commonly called the surface tension of the water. Thus, a degasification of the water takes place.

The lower portion 20 of the housing 12 provides a reservoir for storing heated and degasified water until it is removed for use. In order to prevent the level of heated water 21 in the housing 12 from rising above and thereby submerging nozzles 14 and accordingly disrupting their spray action, the housing 12 is provided with a high water level alarm 22 seen in FIGURE 1. In order to signal the operator of an impending shortage of heated process water, the housing 12 is provided with a low water level alarm 23.

Heated water is removed from the lower portion 20 of the housing 12 through a water outflow means shown as outlet port 24 formed in the bottom 25 of the housing 12. The water outlet port 24 has a guard 26 formed thereabout. The direct contact water heater 11, its structure and operation, are well known in the heat exchange art.

The filter chamber 13 which conducts water to spray nozzles 14 is shown in FIGURES 1 and 4 as the wedge-shaped filter chamber 13 formed by a portion 27 of housing 12 and wall means including wall 28. Partition means shown as partition 29 divides filter chamber 13 into settling compartment 30 arranged for downward flow and second compartment 31. Settling compartment 30 has a flow portion 32 designed to conduct flow downward and a deposit portion 33. Solid materials 34 are removed from the circulating water by filter means shown as screen 35 disposed in screen opening 36 formed in partition 29. The solid materials 34 separate into deposit portion 33 while flow is conducted downward through flow portion 32 of settling compartment 30.

All of the flow control is accomplished from outside the heater 11 by operating inflow valve 40 operatively associated with inflow port 41 and by operating blowdown valve 43 disposed in blowdown port 44 which communicates with deposit portion 33 of settling compartment 30. Both bypass valve 45 with bypass opening 46 shown in FIGURES 1, 2 and 4 and backwash valve 47 with backwash opening 48 shown in FIGURES 1, 3 and 5 are spring type one way pressure actuated valves. The spray nozzles 14 shown in FIGURES 1 and 4 are actuated by an excess of pressure on the second compartment side of said spray nozzles.

The usual path 51 of circulating water through direct contact heater 11 is shown in FIGURE 6. During normal flow inflow valve 40 in inflow port 41 is opened and blowdown valve 43 in blowdown port 44 is closed. Screen 35 is relatively unobstructed by solid materials 34. Bypass valve 45 and backwash valve 47 would be in their normal closed positions. Water entering the heater 11 flows through inflow port 41 past open inflow valve 40 into settling compartment 30 of heater 11. The projection 52 of partition 29 shields screen 35 from the impact of the stream of water issuing from inflow port 41 which shielding action is especially important when settling compartment 30 is empty.

Solid materials 34 are mechanically filtered out of the water as flow passes through screen opening 36.

Deposit portion 33 of settling compartment 30 is arranged to be out of the usual path 51 of circulating water so that the velocity of flow in deposit portion 33 is a minimum thereby encouraging the separation of solid materials 34. The usual path 51 of circulating water is also arranged to have an angular acceleration which imparts a centrifugal force directed downward to augment gravity in settling the solid materials 34.

After separation, solid materials 34 may be removed from deposit portion 33 of settling compartment 30 through the blowdown port 44.

*Backwash System*

Backwash valve 47 shown in detail in FIGURE 3 comprises backwash seat 60, backwash plug 61 connected to backwash stem 62 which confines backwash spring 63 between backwash collar 64 and backwash wings 65. Backwash opening 48 is defined by backwash seat 60 and backwash plug 61. Backwash valve 47 is normally held in closed position by the thrust of backwash spring 63. Upon an increase in the pressure in contact chamber 15 over the pressure in second compartment 31 to a predetermined level, the effective pressure differential acting on the face 67 of backwash plug 61 adjacent contact chamber 15 overcomes the expansive thrust of backwash spring 63 causing backwash spring 63 to compress and backwash stem 62 to move toward second compartment 31 thereby causing backwash plug 61 to unseat exposing backwash opening 48 and causing water to be ejected under the hydrostatic head of the level 21 of heated water in lower portion 20 of the housing 12 and the super-imposed steam pressure into second compartment 31. Backwash valve 47 is positioned to project water onto the second compartment side 68 of screen 35 to dislodge and remove solid materials 34 from settling compartment side 69 of screen 35.

The backwash arrangement is schematically illustrated in FIGURE 7 with 53 the path of water during the bypass operation. When the flow of water through screen 35 is impaired by the clogging of solid materials 34 onto settling compartment side 69 of screen 35, the pressure drop across screen 35 from the settling compartment 30 to second compartment 31 increases. Pressure taps are provided at 70 and 71 as shown in FIGURE 4 to communicate with the pressure in settling compartment 30 and second compartment 31, respectively.

The difference in pressure between these two compartments 30, 31 may be measured by a monometer or a differential pressure gauge not shown. As the difference in pressure builds up over a desired level an operator is signaled that backwashing of screen 35 is desirable. The pressure differential across screen 35 to indicate the desirability of backwashing is arranged to be less than the pressure differential required to actuate bypass valve 45.

In order to backwash screen 35, the operator need only shut inflow valve 40 and open blowdown valve 43. The closing of inflow valve 40 and the opening of blowdown valve 43 permits the draining of water from settling compartment 30 and second compartment 31. Water drains away from the spray nozzles 14 and bypass valve 45 and they are both inoperative during the backwash operation. The reduction of pressure in second compartment 31 resulting from the draining of water out of said second compartment 31 gives rise to an excess of pressure on face 67 of backwash plug 61 adjacent contact chamber 15 over the pressure on face 72 of backwash plug 61 adjacent second compartment 31. The excess of pressure in the contact chamber 15 over second compartment 31 causes the backwash valve plug 61 to unseat, thereby permitting process water from the lower portion 20 of the housing 12 to flow under gravity through backwash opening 48 onto second compartment side 68 of screen 35 to dislodge solid materials from the settling compartment side 69 of screen 35 down into the deposit portion 33 of settling compartment 30. The solid materials 34 pass out of settling compartment 30 through blowdown port 44. The backwash means illustrated in FIGURE 7 is the preferred embodiment, but all that is necessary for reversing flow through screen 35 is a reversal of the hydraulic gradient.

*Bypass Valve Arrangement*

The bypass valve is available to shunt unscreened process water past screen 35 from settling compartment 30 to second compartment 31. Bypass valve 45 shown in detail in FIGURE 2 comprises bypass seat 80, bypass plug 81 connected to bypass stem 82 which reacts against bypass spring 83 compressed between bypass collar 84 and bypass wings 85. Bypass wings 85 are connected to bypass valve housing 86 upon which bypass seat 80 is formed. Bypass opening 46 is defined by bypass seat 80 and bypass plug 81. Bypass valve 45 is normally held in closed position by the thrust of bypass spring 83. Bypass valve 45 is operable in response to a pressure differential between settling compartment 30 and second compartment 31 of a higher order of magnitude than the pressure differential between settling compartment 30 and second compartment 31 used to indicate to an operator the desirability of backwashing screen 35. Bypass valve 45 is designed to open when screen 35 is so clogged with solid materials 34 that screen 35 is virtually impassable. Upon such an increase in the pressure in settling compartment 30 over the pressure in second compartment 31, the pressure acting on the face 87 of bypass plug 81 adjacent settling compartment 30 overcomes the expansive thrust of bypass spring 83 and the pressure acting on the face 88 of bypass plug 81 adjacent second compartment 31 causes bypass spring 83 to compress and bypass stem 82 to move toward second compartment 31 thereby causing bypass plug 81 to unseat exposing bypass opening 46. Water is thus caused to pass from the higher pressure settling compartment 30 to the lower pressure second compartment 31. When the thrust of the effective pressure differential acting on the face 87 of bypass plug 81 adjacent settling chamber 30 decreases below the thrust of bypass spring 83, bypass spring 83 urges bypass stem 82 toward settling compartment 30 thereby seating bypass plug 81 and shutting off flow through the bypass port 46 from settling compartment 30 to second compartment 31.

Various features are provided to facilitate the operation of the direct contact water heater 11. Access to backwash valve 47 is had via a manhole in contact chamber 15, which manhole is not shown. Access to screen 35 and bypass valve 45 is had via a manhole which communicates with settling compartment 30, which manhole is not shown. Screen 35 is built in sections of a suitable size to be passed in and out of the manhole which communicates with settling compartment 30. A safety valve 89 is also provided to relieve a possible excess of pressure in contact chamber 15.

It will be understood that changes may be made in the details of construction and in the correlation of the various elements of this direct contact water heater 11 to accomplish the same results without departing from the spirit of the invention or the scope of the claims.

What is claimed is:
1. A direct contact heater comprising:
   (a) a unitary housing having an upper portion and a lower portion therein,
   (b) a contact chamber formed in the upper portion of said housing by the walls thereof for mixing water with steam for heat exchange,
   (c) means connected to said housing to deliver steam to said contact chamber from a steam source.
   (d) a filter chamber formed in the lower portion of said housing bounded by a portion of the side wall thereof and wall means connected about said side wall portion of said housing,
   (e) partition means in said filter chamber forming a settling compartment and a second compartment,
   (f) inflow means for admitting water into said settling compartment,
   (g) filter means disposed in said partition means between said settling compartment and said second compartment,
   (h) blowdown means in said housing including a blowdown port communicating with said settling compartment and adapted to operate to remove sediment and water therefrom,
   (i) water spreading means connected to said filter chamber and to communicate water from said second compartment to said contact chamber,
   (j) said water spreading means to spread water in said contact chamber in heat exchange relationship with the steam therein,
   (k) vent means operatively connected to said housing downstream of said contact chamber to remove steam therefrom,
   (l) outflow means for removing water from said contact chamber,
   (m) control means connected to said inflow means and adapted to shut off the inflow of water therethrough,
   (n) the lower portion of said housing forming a reservoir for heated water below said water spreading means,
   (o) backwash means connected in said filter chamber between said reservoir and said second compartment adjacent said filter means,
   (p) said backwash means adapted to automatically operate responsive to a pre-set pressure differential in said reservoir and said second compartment to flush water from said reservoir through said second compartment and said filter means on said control means shutting off the inflow of water and said blowdown means being operated.

2. The combination claimed in claim 1 wherein said backwash means include a backwash port formed in said wall means whereby on operation of said backwash means the water in said reservoir will pass through said backwash port into said second compartment.

3. The combination claimed in claim 1 wherein baffle means connected to said housing between said means to deliver steam and said water spreading means to prevent steam from said steam delivery means from directly entering said contact chamber whereby a more uniform steam distribution can be obtained.

4. The combination claimed in claim 1 wherein
   (a) said settling compartment to direct the water from said inflow means in a vertically downward direction,
   (b) said filter means including a screen means vertically disposed in said partition means to cause separation of solids in the water when the water changes direction on flowing through said screen means.

5. The combination claimed in claim 4 wherein
   (a) said partition means disposed in a substantially vertical plane,
   (b) bypass means disposed in said partition means in superposition to said screen means,
   (c) said bypass means adapted to automatically operate responsive to a pre-set pressure differential in said second compartment and said settling compartment on said screen means clogging and preventing flow therethrough whereby water can pass from said settling compartment into said second compartment.

References Cited in the file of this patent
UNITED STATES PATENTS

| | | |
|---|---|---|
| 147,624 | Fenn | Feb. 17, 1874 |
| 665,995 | Colles | Jan. 15, 1901 |
| 2,401,039 | Bauer | May 28, 1946 |
| 2,564,584 | Sebald | Aug. 14, 1951 |